(12) United States Patent
Matsushita

(10) Patent No.: US 9,137,310 B2
(45) Date of Patent: Sep. 15, 2015

(54) COMMUNICATION DEVICES, METHODS AND COMPUTER READABLE STORAGE MEDIA

(75) Inventor: Takashi Matsushita, Kasugai (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 589 days.

(21) Appl. No.: 13/404,934

(22) Filed: Feb. 24, 2012

(65) Prior Publication Data

US 2012/0221672 A1 Aug. 30, 2012

(30) Foreign Application Priority Data

Feb. 25, 2011 (JP) .................. 2011-039889

(51) Int. Cl.
*G06F 15/167* (2006.01)
*G06F 15/16* (2006.01)
*H04L 29/08* (2006.01)
*H04L 29/06* (2006.01)

(52) U.S. Cl.
CPC .......... *H04L 67/141* (2013.01); *H04L 65/1069* (2013.01); *H04L 65/1073* (2013.01); *H04L 65/403* (2013.01); *H04L 67/143* (2013.01)

(58) Field of Classification Search
CPC ........ H04L 12/66; H04L 67/14; H04L 67/143
USPC .................. 709/203, 213–214, 217
See application file for complete search history.

(56) References Cited

U.S. PATENT DOCUMENTS

| 7,886,033 | B2* | 2/2011 | Hopmann et al. ............. 709/223 |
| 8,335,820 | B1* | 12/2012 | Krigovski et al. ............. 709/203 |
| 2002/0063777 | A1 | 5/2002 | Maekawa et al. |
| 2008/0215595 | A1* | 9/2008 | Suda .............................. 707/10 |

FOREIGN PATENT DOCUMENTS

JP 2002-247566 A 8/2002

* cited by examiner

*Primary Examiner* — Minh-Chau Nguyen
(74) *Attorney, Agent, or Firm* — Baker Botts L.L.P.

(57) ABSTRACT

A communication device includes a memory that has a first storage area that stores an identifier of a first communication device, which is in a communication session with the communication device, and a second storage area that stores an identifier of a second communication device, which established a communication session with the communication device. The communication device performs the steps of: notifying the identifier stored in the first storage area to the first communication device, receiving an identifier stored in a first storage area of the first communication device from the first communication device, determining whether the identifier received from the first communication device is stored in the second storage area of the communication device, restricting re-establishment of the communication session with the first communication device when the identifier received from the first communication device is stored in the second storage area of the communication device.

13 Claims, 16 Drawing Sheets

Fig.11

COMMUNICATION DEVICES, METHODS AND COMPUTER READABLE STORAGE MEDIA

CROSS-REFERENCE TO RELATED APPLICATION

This application claims priority from Japanese Patent Application No. 2011-039889, filed on Feb. 25, 2011, which is incorporated herein by reference.

BACKGROUND OF THE INVENTION

1. Field of the Invention

The present invention relates generally to communication devices, communication methods, and computer readable storage media containing computer-readable instructions for performing a Peer-to-Peer (P2P) type communication.

2. Description of Related Art

A videoconference may be implemented by a P2P type communication among a plural communication devices. In the P2P type communication, the concentration of data packets at a Multi-point Control Unit (MCU) is prevented, as compared with a conventional videoconference of a client-server type. When holding the videoconference through the P2P type communication, a communication device determines the validity of a session with another communication device. The videoconference is implemented smoothly without interruption. The validity of a session is determined by a Keep-Alive data packet.

A known communication device may automatically reestablish a session when a disconnection of the session is determined due to a deteriorated communication condition or the like. In the known communication device, when a disconnection of a session due to an impaired line or the like is determined, reestablishment processing for the disconnected session is performed automatically. After the reestablishment of the session, the communication may resume. Thus, the videoconference is implemented without interruption even when the communication condition deteriorate temporarily.

SUMMARY OF THE INVENTION

When a particular communication device intentionally disconnects from a session with another communication device in order to terminate a videoconference, the disconnected session may be reestablished by the reestablishment processing in the particular communication device. Thus, the particular communication device does not disconnect from the session and remains connected to the session, even after the particular device terminates the videoconference.

A need has arisen for communication devices, communication methods, and computer-readable storage media containing computer-readable instructions which overcomes these and other shortcomings of the related art. A technical advantage of the present invention is that a communication device may reliably disconnect from a session with another communication device.

According to an embodiment of the present invention, a communication device comprising: a memory comprising a first storage area configured to store an identifier of a first communication device, which is in a communication session with the communication device, and a second storage area configured to store an identifier of a second communication device, which established a communication session with the communication device; a controller configured to control the communication device to execute steps of: notifying the identifier stored in the first storage area to the first communication device, which is in the communication session with the communication device; receiving an identifier stored in a first storage area of a memory of the first communication device from the first communication device; determining whether the identifier received from the first communication device is stored in the second storage area of the memory of the communication device; restricting re-establishment of the communication session with the first communication device when the identifier received from the first communication device is stored in the second storage area of the memory of the communication device.

According to another embodiment of the present invention, a method for implementing a communication session at a communication device, the method comprising the steps of: storing an identifier of a first communication device, which is in the communication session with the communication device, in a first storage area of a memory of the communication device; storing an identifier of a second communication device, which established a communication session with the communication device, in a second storage area of the memory of the communication device; notifying the identifier stored in the first storage area to the first communication device, which is in the communication session with the communication device; receiving an identifier stored in a first storage area of a memory of the first communication device from the first communication device; determining whether the identifier received from the first communication device is stored in the second storage area of the memory of the communication device; restricting re-establishment of the communication session with the first communication device when the identifier received from the first communication device is stored in the second storage area of the memory of the communication device.

According to still another embodiment of the present invention, A non-transitory computer readable storage medium storing computer readable instructions that, when executed, cause a communication device to execute the steps of: storing an identifier of a first communication device, which is in the communication session with the communication device, in a first storage area of a memory of the communication device; storing an identifier of a second communication device, which established a communication session with the communication device, in a second storage area of the memory of the communication device; notifying the identifier stored in the first storage area to the first communication device, which is in the communication session with the communication device; receiving an identifier stored in a first storage area of a memory of the first communication device from the first communication device; determining whether the identifier received from the first communication device is stored in the second storage area of the memory of the communication device; restricting re-establishment of the communication session with the first communication de vice when the identifier received from the first communication device is stored in the second storage area of the memory of the communication device.

Other objects, features, and advantages of an embodiment of the invention will be apparent to persons of ordinary skill in the art from the following description of an embodiment with reference to the accompanying drawings.

BRIEF DESCRIPTION OF THE DRAWINGS

For a more complete understanding of the present invention, needs satisfied thereby, and the objects features, and advantages thereof, reference now is made to the following descriptions taken in connection with the accompanying drawings.

FIG. 11 is a diagram depicting a sequence of communication among communication devices according to an embodiment of the invention.

DETAILED DESCRIPTION OF EMBODIMENTS OF THE INVENTION

Figure 1:
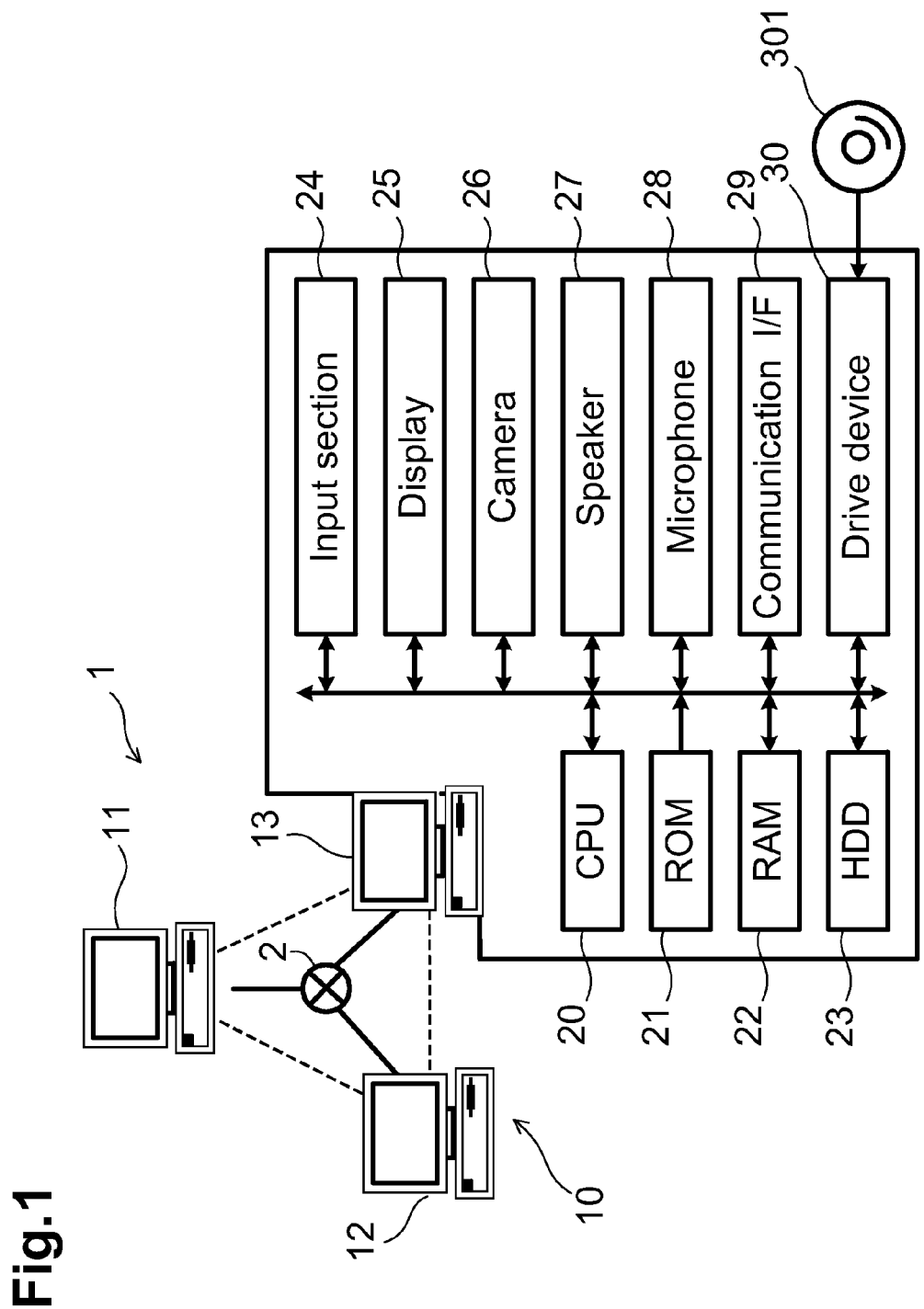
FIG. 1 depicts a system of communication devices and an electrical configuration of a communication device according to an embodiment of the invention.

Embodiments of the invention now are described in detail with reference to the accompanying drawings, like reference numerals being used for corresponding parts in the various drawings.

Referring to FIG. 1, a communication system 1 may comprise a plurality of communication devices 10. The plurality of communication devices 10 may comprise communication devices 11, 12, and 13. The plurality of communication devices 10 may perform the P2P-type communication with each other over a network 2 to hold a videoconference. The videoconference implemented via the P2P-type communication may include video and audio communication without an intervening server between the plurality of communication devices 10. Each of the plurality of communication devices 10 may be a personal computer (PC) or a device configured for videoconferencing. Reference numerals, e.g., 11, 12, and 13, labeling each of the plurality of communication devices 10 may also represent the IDs of the respective communication devices 10. Dotted lines connecting the plurality of communication devices 10 may depict sessions of the P2P-type communication established between the plurality of communication devices 10.

Referring to FIG. 1, the communication device 13 may comprise a CPU 20, e.g., a controller, configured to control of the communication device 13. The CPU 20 may be electrically connected to a ROM 21, a RAM 22, an Hard Disk Drive (HDD) 23, an input section 24, a display 25, a camera 26, a speaker 27, a microphone 28, a communication interface (I/F) 29, and a drive device 30. The ROM 21 may have a boot program, a basic input/output system (BIOS), an operation system (OS) and the like stored therein. The RAM 22 may have a timer, a counter, and temporary data stored therein. The HDD 23, e.g., a memory, may have a communication program for the CPU 20 and a table 31 including an in-establishment ID, e.g., a first storage area, and a history ID, e.g., a second storage area, stored therein. The input section 24 may include a keyboard or a mouse, or both, which may receive input from a user. The communication I/F 29 may perform timing control in performing communication with another communication device over the network 2. The drive device 30 may read information stored on a storage medium 301. For example, at the time of setup of the communication device 13, computer-readable instructions stored on the storage medium 301 may be read by the drive device 30 and stored on the HDD 23. Alternatively, the computer-readable communication instructions may be downloaded from a predetermined server device over the network 2. The communication devices 11 and 12 may comprise similar elements to those of the communication device 13.

The communication device 11 may establish a session with the communication devices 12 and may notify the communication device 12 of the ID of the communication device 13, with which the communication device 11 establishes a session. An establishment notifying communication may be the communication for notifying the ID of the communication device 10 with which a session is established. Each of the plurality of communication devices 10 may perform the establishment notifying communication to the other communication devices 10. For example, the communication device 12 may notify the communication device 13 of the ID of the communication device 11 indicating that the communication device 12 establishes a session with the communication device 11. Further, the communication device 13 may notify the communication device 11 of the ID of the communication device 12 indicating that the communication device 13 establishes a session with the communication device 12.

Figure 2:
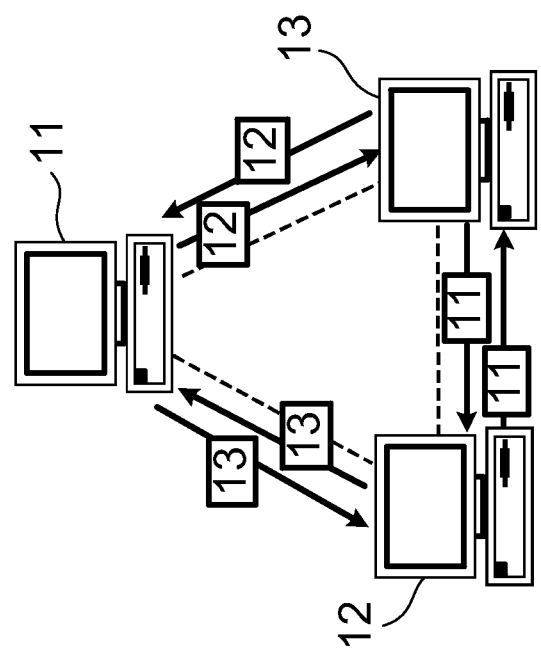
FIG. 2 is a diagram depicts communication paths among communication devices according to an embodiment of the invention.

Referring to FIG. 2, sessions may be established among the communication devices 11, 12, and 13. The communication device 11 may periodically transmit a packet for notifying the ID of the communication device 13 to the communication device 12. The communication device 11 may periodically transmit a packet for notifying the ID of the communication device 12, indicating that the communication device 12 established session with the communication device 11, to the communication device 13. Similarly, each of the communication devices 12 and 13 may periodically transmit a packet for notifying the ID of the communication devices with which session are established. Specifically, the communication device 12 may periodically transmit a packet for notifying the ID of the communication device 11 to the communication device 13. In addition, the communication device 12 may periodically transmit a packet for notifying the ID of the communication device 13 to the communication device 11. The communication device 13 may periodically transmit a packet for notifying the ID of the communication device 11 to the communication device 12. In addition, the communication device 13 may periodically transmit a packet for notifying the ID of the communication device 12 to the communication device 11. The packet transmitted periodically for notifying the ID in the establishment notifying communication may be referred to as an establishment notifying packet.

In response to reception of the establishment notifying packet from the communication device 11, the communication device 12 may transmit acknowledgement (ACK) back to the communication device 11. Because the communication device 12 receives the establishment notifying packet transmitted from the communication device 11 without an error, the communication device 12 may determine that the communication device 12 successfully performed communication through a session with the communication device 11. The communication device 12 may also determine that the communication device 11, which transmitted the establishment notifying packet, successfully communicates with the communication device 13 identified by the notified ID by establishing a session between the communication device 11 and the communication devices 12, and a session between the communication devices 12 and the communication devices 13. In addition, the communication device 12 may check whether the communication device 13 identified by the notified ID communicates with the communication device 12 through a session between the communication device 12 and the communication device 13. As shown in FIG. 2, the communication devices 12 and 13 may communicate with each other through the sessions between the communication device 12 and the communication device 13. Thus, the communication device 12 may determine that the communication devices 11, 12, and 13 successfully communicate with each other through the sessions among the communication devices 11, 12 and 13.

Each of the communication devices 11 and 13 similarly may determine, in response to reception of the establishment notifying packets from other communication devices 10, that the communication devices 11, 12, and 13 successfully communicate with each other through the sessions.

Figure 3:
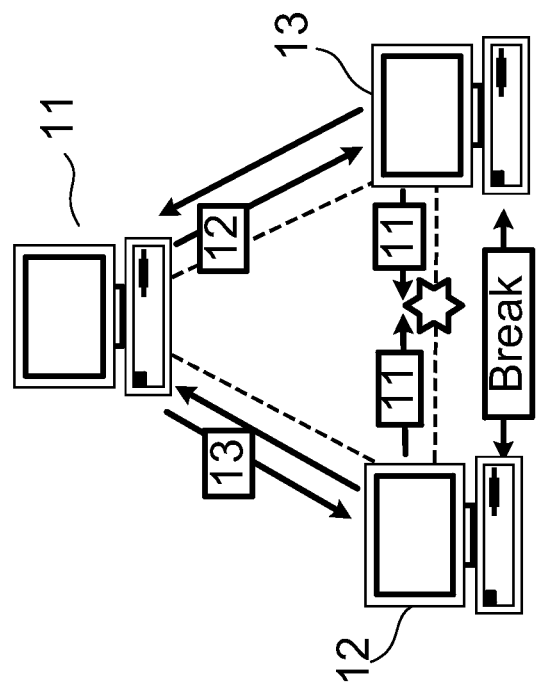
FIG. 3 is another diagram depicting communication paths among communication devices according to an embodiment of the invention.

Referring to FIG. 3, the communication condition of the communication channel between the communication device 12 and the communication device 13 may deteriorate. The deteriorated communication condition may cause a disconnection of the communication between the communication device 12 and the communication device 13. Alternatively, the deteriorated communication condition may cause a reduction in bandwidth available for the communication between the communication device 12 and the communication device 13. When the establishment notifying packet transmitted from the communication device 12 to the communication device 13 is lost on the communication channel, the communication device 13 may not receive the establishment notifying packet from the communication device 12. In addition, the communication device 12 may not receive ACK for the transmitted establishment notifying packet. Similarly, when the establishment notifying packet transmitted from the communication device 13 to the communication device 12 is lost on the communication channel, the communication device 12 may not receive the establishment notifying packet from the communication device 13. In addition, the communication device 13 may not receive ACK for the transmitted establishment notifying packet. If the deteriorated communication channel is used for videoconference communication, the quality of the videoconference may be reduced.

When the communication device 12 does not receive ACK for the transmitted establishment notifying packet or when the communication device 12 does not receive the establishment notifying packet from the communication device 13 for a predetermined period of time of greater, the communication device 12 may perform a process for disconnecting the session between the communication device 12 and the communication device 13. Similarly, the communication device 13 may perform a process for disconnecting the session between the communication device 13 and the communication device 12 when the communication device 13 does not receive ACK for the transmitted establishment notifying packet or when the communication device 13 does not receive the establishment notifying packet from the communication device 12 for at least a predetermined period of time. The disconnection may terminate the P2P-type communication between the communication devices 12 and 13.

Figure 4:
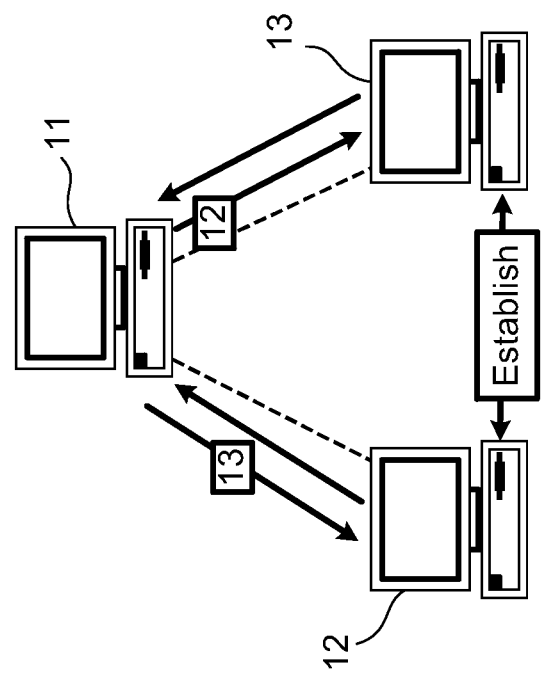
FIG. 4 is still another diagram depicting communication paths among communication devices according to an embodiment of the invention.

After the disconnection of the session between the communication device 12 and the communication device 13, the communication device 11 may transmit the establishment notifying packet for notifying the ID 13 to the communication device 12 and may transmit the establishment notifying packet for notifying the ID 12 to the communication device 13. The communication device 12 may receive the establishment notifying packet for notifying the ID 13 from the communication device 11 even through the session between the communication devices 12 and 13 is disconnected. Thus, the communication device 12 may be notified of the ID of the communication device 13, which is disconnected from the communication device 12. In this case, the communication device 12 may perform an establishment communication with the communication device 13 to establish a session with the communication device 13 identified by the notified ID, as shown in FIG. 4. Similarly, the communication device 13 may be notified of the ID the communication device 12 which is disconnected from the communication device 13. The communication device 13 may perform an establishment communication with the communication device 12 to establish a session with the communication device 12 identified by the notified ID. When the communication condition of the communication channel between the communication devices 12 and 13 is improved, the session between the communication devices 12 and 13 may be reestablished.

As described above, the communication devices 10 may detect the deterioration of the communication condition of the communication channel by performing the establishment notifying communication. The communication devices 10 may disconnect from a session to prevent the communication devices 10 from reducing a reliability of communication among the communication devices 10 and reducing a quality of an application executed between the communication devices 10. The communication devices 10 may automatically perform the establishment communication with the communication devices 10 identified by the ID notified in the establishment notifying packet. Thus, when the communication condition of the communication channel is improved, the communication device 10 may reestablish the session by performing the establishment communication to restart the communication.

In the establishment communication for establishing the session between the communication device 11 and the communication device 13, the communication device 13 may send a request to the communication device 12 via the communication device 11 requesting to establish a session. In response, the communication device 12 may request the communication device 11 to establish the session. The communication device 11 may grant the request. Similarly, the communication device 12 may sent a request to the communication device 13 via the communication device 11 requesting to establish a session. In response, the communication device 12 may request the communication device 13 to establish the session. The communication device 13 may grant the request. As a result, the session may be established between the communication devices 12 and 13.

Figure 5:
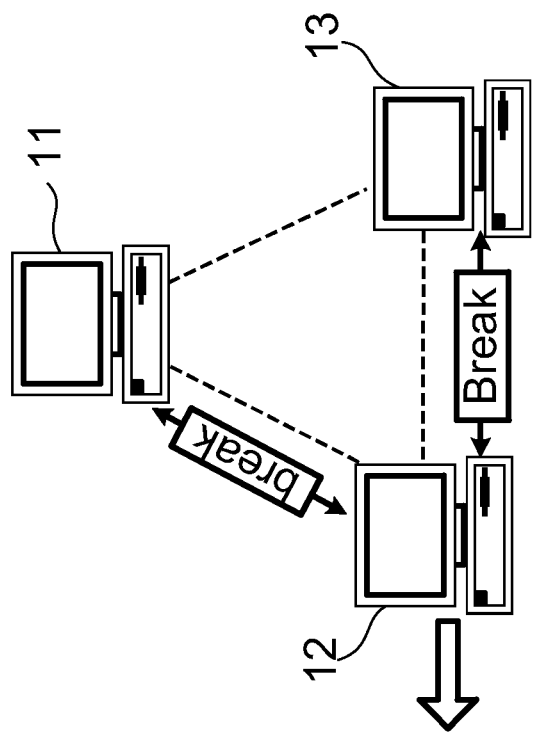
FIG. 5 is yet another diagram depicting communication paths among communication devices according to an embodiment of the invention.
Figure 6:
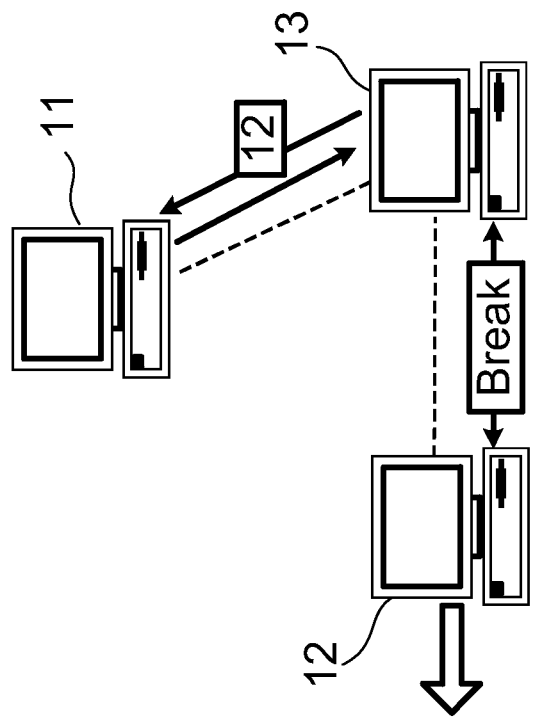
FIG. 6 is another diagram depicting communication paths among communication devices according to an embodiment of the invention.
Figure 7:
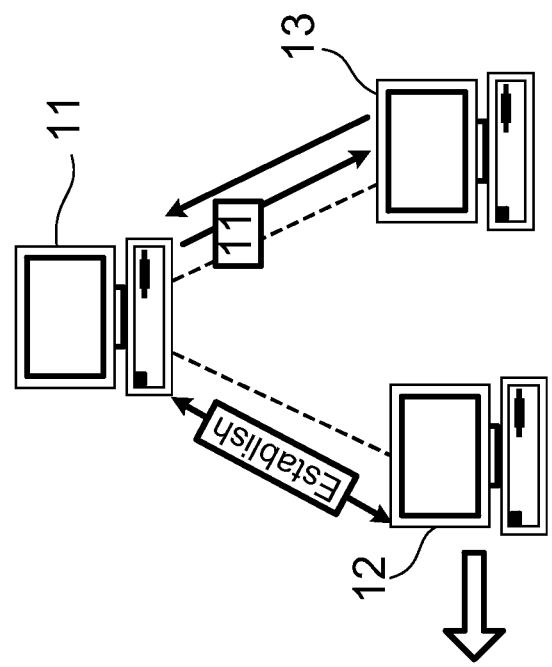
FIG. 7 is another diagram depicting communication paths among communication devices according to an embodiment of the invention.

Referring to FIGS. 5-7, one of the plurality of the communication devices 10 having established sessions among the plurality of the communication devices 10 may intentionally terminate or disconnect the established session. Referring to FIG. 5, the sessions may be established among the communication devices 11, 12, and 13 and the communication device 12 may attempt to disconnect from the sessions with the communication devices 11 and 13 intentionally. The disconnection of the session may be performed by a videoconference application or the like. The communication device 12 may transmit a break request packet for requesting the disconnection of the session to each of the communication devices 11 and 13. Each of the communication devices 11 and 13 may receive the break request packet. Communication for breaking the session may be performed between the communication device 12 and the communication devices 11 and 13. This may cause the sessions to be disconnected.

Referring to FIG. 6, the session between the communication devices 11 and 12 maybe disconnected first. Nevertheless, in a network environment, the communication process for disconnecting the session may not end completely between the communication devices 12 and 13 and the session between them may still be established. The communication device 11 may have the session established only with the communication device 13. Thus, in the establishment notifying communication performed between the communication devices 11 and 13, the communication device 11 may transmit an establishment notifying packet, including no ID to be notified, to the communication device 13.

On the other hand, because the communication device 13 has the session still established with the communication device 12, the communication device 13 may transmit the establishment notifying packet for notifying the ID 12 to the communication device 11. The communication device 11 may be notified of the ID the communication device 12, which has no session established with the communication device 11. In this case, the communication device 11 may start the establishment communication with the communication device 12 for establishing a session with the communication device 12 identified by the notified ID, as shown in FIG. 7. The communication for disconnecting the session may be completed between the communication devices 12 and 13, and, thus, the session may be disconnected between the communication devices 12 and 13. As described above, the intentionally disconnected session among the communication devices 10 may be automatically reestablished depending on the timing of the disconnection of the session.

Figure 8:
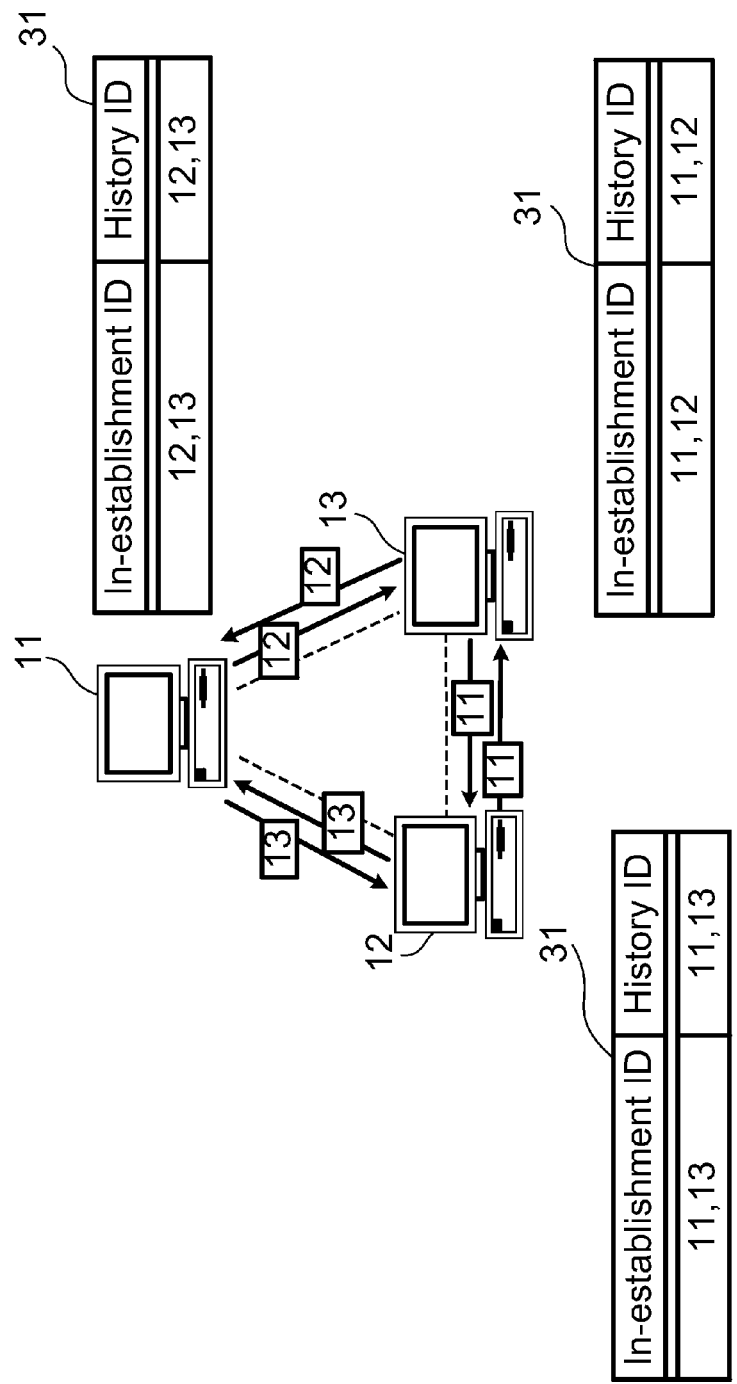
FIG. 8 is another diagram depicting communication paths among communication devices according to an embodiment of the invention.
Figure 9:
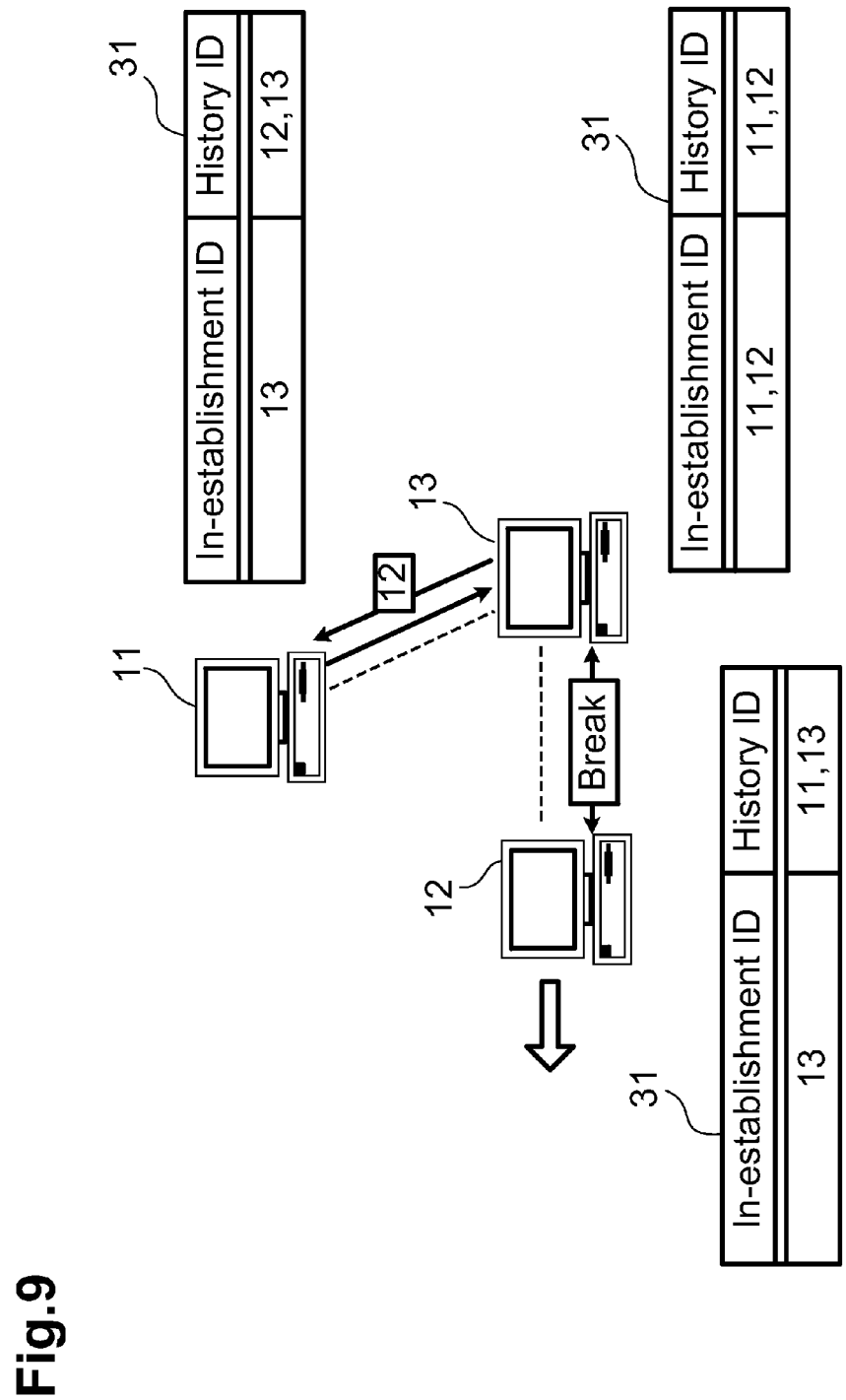
FIG. 9 is another diagram depicting communication paths among communication devices according to an embodiment of the invention.
Figure 10:
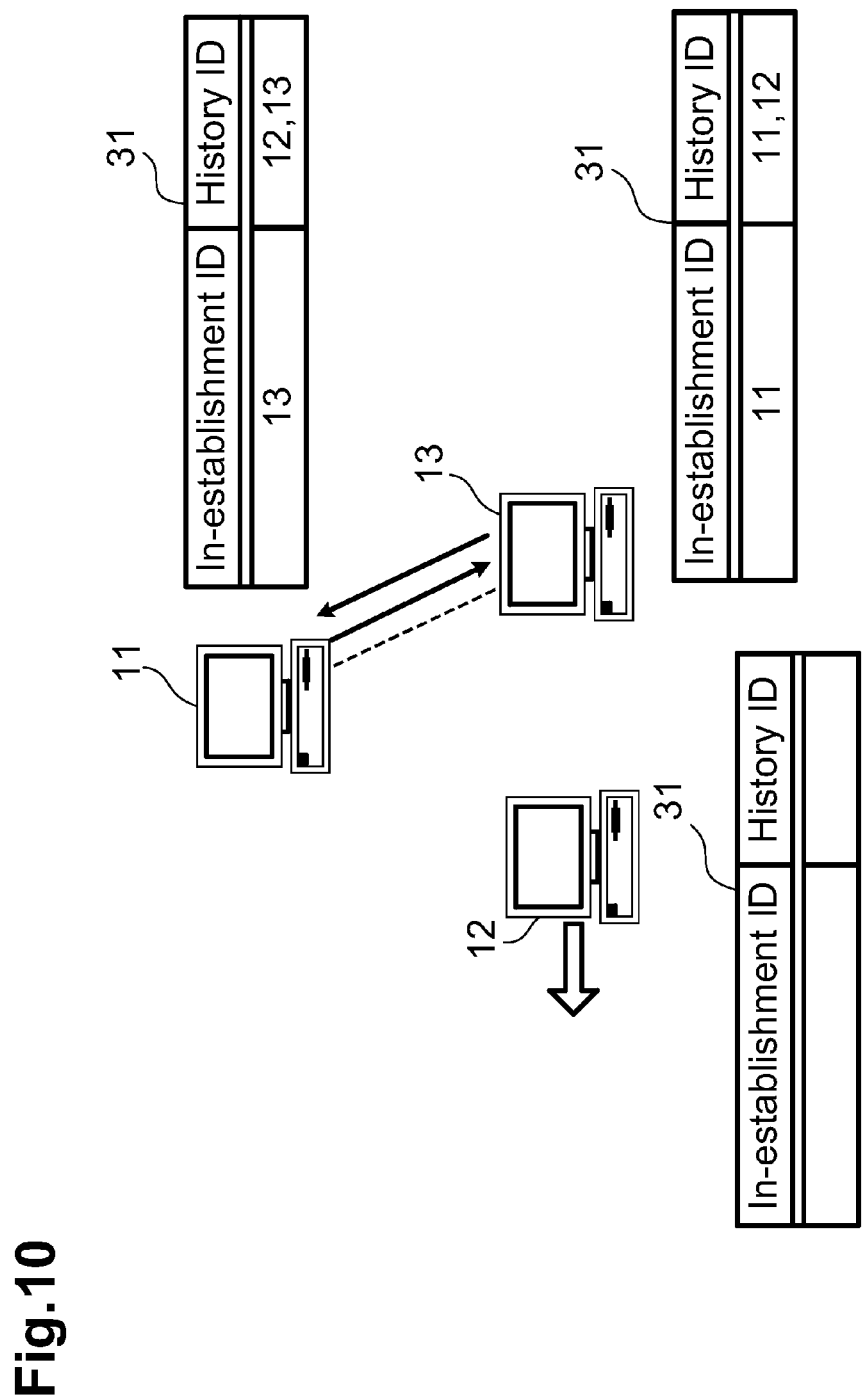
FIG. 10 is another diagram depicting communication paths among communication devices according to an embodiment of the invention.

In an embodiment of the invention, a method is provided that may restrict reestablishment of an intentionally disconnected session. Referring to FIG. 8, each of the plurality of the communication devices 10 may comprise a table 31. For example, the communication device 11 may comprise a table 31 that may store the IDs of communication devices 12 and 13, which have sessions currently established with the communication device 11 and the IDs of communication devices 10, which previously had sessions established with the communication device 11. The communication devices 10 which previously had sessions established with the communication device 11 may be communication devices 10 that had sessions established with the communication device 11 before the current sessions were established. Referring to FIGS. 8-10, the table 31 may store in-establishment IDs, which are the IDs of communication devices 10 currently having sessions. For example, in the communication device 12 as shown in FIG. 8, the ID 11 and the ID 13 may be registered as the in-establishment IDs in the table 31 of the communication device 12. The ID of another communication device 10 which previously established a session with the communication device 12 may be stored as a history ID in the table 31. For example, in the communication device 12 as shown in FIG. 8, the ID 11 and the ID 13 may be registered as the history IDs in the table 31. The table 31 may be stored in the HDD 23.

As shown in FIG. 8, sessions may be established among the plurality of communication devices 10, and the establishment notifying communication may be performed among the plurality of communication devices 10. Because the communication device 11 has established a session with the communication devices 12 and a session with the communication devices 13, the ID 12 and ID 13 may be stored as the in-establishment IDs and the history IDs in the table 31 stored in the communication device 11. The ID 11 and ID 13 may be stored as the in-establishment IDs and the history IDs in the table 31 stored in the communication device 12. The ID 11 and ID 12 may be stored as the in-establishment IDs and the history IDs in the table 31 stored in the communication device 13.

The communication device 12 may attempt to disconnect the session between the communication device 12 and the communication device 11 and the session between the communication device 12 and the communication device 13. The communication device 12 may transmit a disconnect request packet to each of the communication devices 11 and 13. Each of the communication devices 11 and 13 may receive the disconnect request packet. Communication for disconnecting the session between the communication device 12 and the communication device 11 and the session between the communication device 12 and the communication device 13 may begin. As shown in FIG. 9, the session between the communication device 11 and the communication device 12 may be disconnected first while the session between the communication device 12 and the communication device 13 may remain established. Because the session between the communication device 11 and the communication device 12 is disconnected, the ID 12 may be deleted from the in-establishment IDs in the table 31 stored in the communication device 11. The ID 11 may be deleted from the in-establishment IDs in the table 31 stored in the communication device 12.

Because the communication device 11 has established the session only with the communication device 13, the communication device 11 may transmit an establishment notifying packet, including no ID to be notified, to the communication device 13. In this case, because the communication device 13 has still established the session with the communication device 12, the communication device 13 may transmit the establishment notifying packet for notifying the ID 12 to the communication device 11.

In the communication device 11, the ID 12 notified in the establishment notifying packet is not stored as the in-establishment ID but is stored as the history ID. When the notified ID is stored as the history ID in the table 31, the communication device 11 may not start to establish a session with the communication device 12 indicated by the notified ID even when the notified ID is not stored as the in-establishment ID. Consequently, the communication device 11 may not start to establish communication with the communication device 12. Thus, no session may be established between the communication devices 11 and 12. The communication for disconnecting the session may be completed between the communication device 12 and the communication device 13, and, thus, the session may be disconnected between the communication device 12 and the communication device 13. As shown in FIG. 10, the session between the communication device 12 and each of the communication devices 11 and 13 may be disconnected.

When the notified ID of the communication device 12 is stored as the history ID at the table 31 of the communication device 11, the communication device 11 may not start the establishment communication with the communication device 12 even when no session is established with the communication device 12 indicated by the notified ID. The ID of the communication device 12, with which a session was previously established, may be stored as the history ID. Thus, if the notified ID of the communication device 12 is stored as the history ID, there may be a greater possibility that the session with the communication device 12 indicated by the notified ID may be disconnected intentionally. According, the communication device 11 may prevent the automatic reestablishment of the intentionally disconnected session. The communication device 11 may successfully disconnect the session. On the other hand, when the notified ID of the communication device 12 is neither stored as the in-establishment ID nor as the history ID, the communication device 11 may start establishment communication for establishing a session with the communication device 12 indicated by the notified ID. Thus, the communication device 11 may establish the session with the communication device 12, which was unintentionally disconnected.

The communication condition may deteriorate between the communication device 12 and the communication device 13, and the session between the communication device 12 and the communication device 13 is broken or disconnected, as shown in FIG. 3. Because the session is established between the communication device 12 and the communication device 13, as shown in FIG. 2, the table 31 stored in the communication device 12 may register at least the ID 13 as the history ID. The table 31 stored in the communication device 13 may register at least the ID 12 as the history ID. When the ID 13 is notified by the communication device 11 to the communication device 12, as shown in FIG. 3, the communication device 12 may store the notified ID 13 as the history ID in the table 31. Thus, the establishment communication for establishing the session between the communication device 12 and the communication device 13 may not started. Similarly, when the ID 12 is notified by the communication device 11 to the communication device 13, the establishment communication for establishing the session with the communication device 12 may not be started. Consequently, when the above method is employed, the session disconnected due to the deteriorated communication condition may not be reestablished.

According to an embodiment of the invention, a disconnected session caused by deteriorating communication conditions may be reestablished using the following method. When the session between the communication device 12 and the communication device 13 is broken due to the deteriorated communication condition, the communication device 12 temporarily may store the ID 13 of the communication device 13 in the RAM 22. When the ID 13 is notified from the communication device 11 to the communication device 12 by the establishment notifying communication, the communication device 12 may store the notified ID 13 in the RAM 22. In such a case, even when the notified ID is stored as the history ID, the communication device 12 may perform the establishment communication for establishing a session with the communication device 13 identified by the notified ID if the notified ID is not stored as the in-establishment ID. Similarly, when the ID 12 is notified from the communication device 11 to the communication device 13, the communication device 13 may perform the establishment communication for establishing a session with the communication device 12 because the RAM 22 stores the notified ID 12 therein. As described above, the communication device 10 may reestablish the session disconnected due to the deteriorated communication condition after the communication condition improves.

Figure 11:
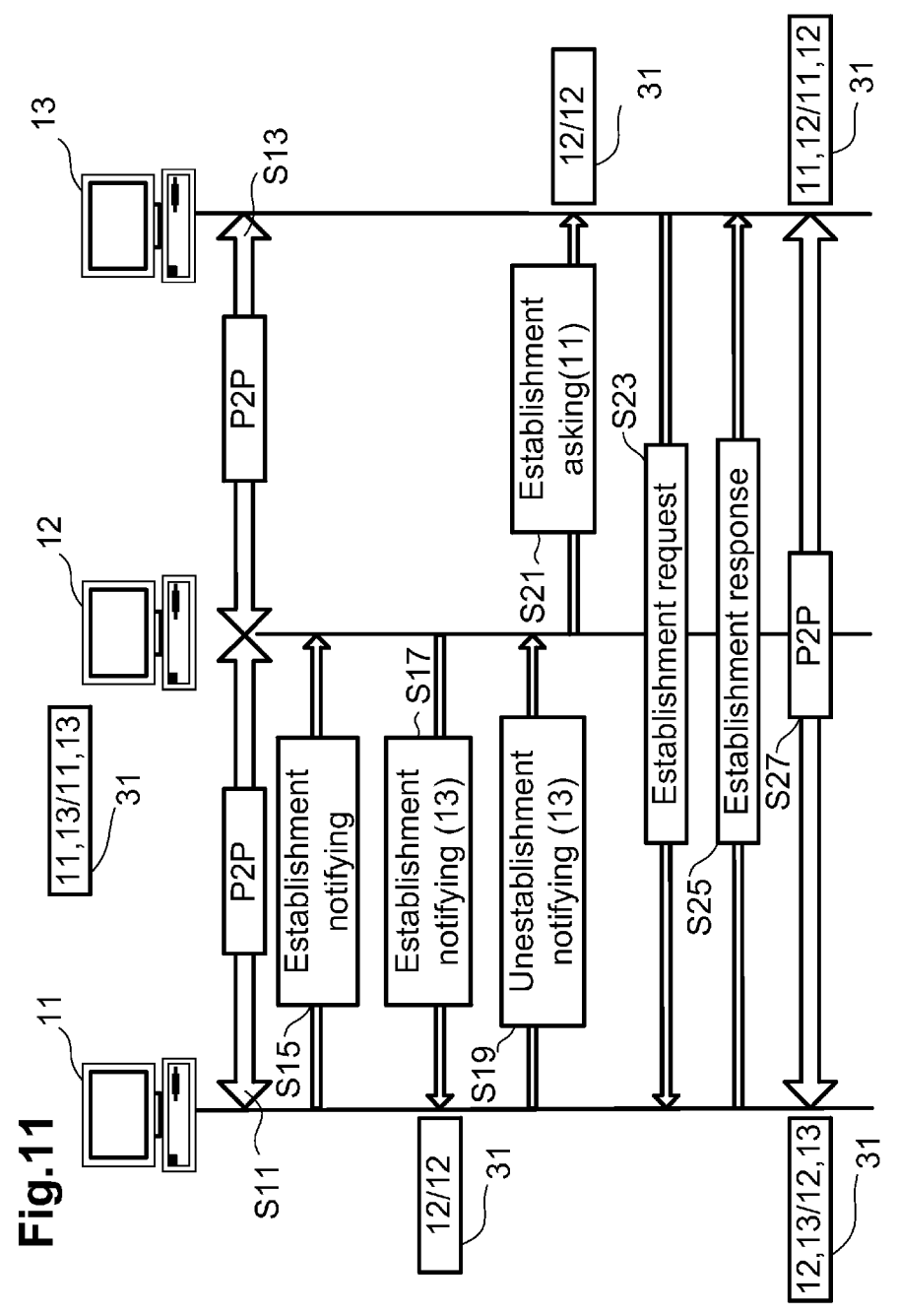

Referring to FIG. 11, the numerals within the table 31 may represent the in-establishment ID/history ID. At step S11, a session may be established between the communication device 11 and the communication device 12 and the P2P-type communication may be perform between the communication device 11 and the communication device 12. At step S13, a session between the communication device 12 and the communication device 13 may be established, and the P2P-type communication between the communication device 12 and the communication device 13 may be performed. At steps S11 and S13, a session between the communication device 11 and the communication device 13 may not be established, and the P2P-type communication between the communication device 11 and the communication device 13 may not be performed.

The communication device 11 may transmit an establishment notifying packet to the communication device 12. Because the session between the communication device 11 and the communication device 12 has just been established, the transmitted establishment notifying packet may include no ID to be notified. At step S15, the communication device 12 may receive the establishment notifying packet. The communication device 12 may transmit an establishment notifying packet to the communication device 11. Because the session between the communication device 12 and communication devices 11, and the session between the communication device 12 and the communication device 13 are established, the ID 13 may be notified to the communication device 11 by the establishment notifying packet. At step S17, the communication device 11 may receive the establishment notifying packet.

The table 31 stored in the communication device 11 may not register the notified ID 13 as the in-establishment ID. Thus, the communication device 11 may start the establishment communication with the communication device 13 in order to establish a session with the communication device 13 identified by the notified ID.

First, the communication device 11 may transmit a packet for notifying the ID of the communication device 13, with which the establishment of a session is desired, to the communication device 12. The packet for notifying the ID of the communication device 10 with which the establishment of a session is desired may be referred to as an unestablishment notifying packet. At step S19, the communication device 12 may receive the unestablishment notifying packet (S19). The communication device 12 may transmit a packet for asking the communication device 13 to request the communication device 11 to establish a session to the communication device 13. The transmitted packet may include the ID of the communication device 11 with which the session is to be established. The packet for asking the request for the establishment of a session may be referred to as an establishment asking packet. At step S21, the communication device 13 may receive the establishment asking packet.

The communication device 13 may recognize that the session between the communication device 11 and the communication device 13 is not established Because the ID notified in the establishment asking packet is not stored as the in-establishment ID. The communication device 13 may transmit a packet for requesting the establishment of the session to the communication device 11 indicated by the ID notified in the establishment asking packet. The packet for requesting the establishment of a session may be referred to as an establishment request packet. At step S23, the communication device 11 may receive the establishment request packet. In response to the establishment request packet, the communication device 11 may transmit a packet for permitting the establishment of the session to the communication device 13. The packet for permitting the establishment of a session in response to the establishment request packet may be referred to as an establishment response packet. At step S25, the communication device 13 may receive the establishment response packet. At step S27, the session between the communication device 11 and the communication device 13 may be established, and the P2P-type communication may be performed. As described above, the communication device 11 may perform the establishment communication with the communication device 13 which does not establish a session with the communication device 11. With these steps, a new session with between two communication devices 10 may be established.

Through the execution of the above establishment communication, the communication device 13 may determine whether a session between the communication device 11 and the communication device 13 is established. When the communication device 13 determines that a session between the communication device 11 and the communication device 13 is not established, a session may be established between the communication device 11 and the communication device 13. When both the communication device 11 and the communication device 13 determine that a session between the communication device 11 and the communication device 13 is not established, the session may be established. This may prevent the communication device 11 and the communication device 13 from executing establishment communication when a session is established only in one direction, in which a redundant session between the communication device 11 and the communication device 13 is established.

Referring to FIGS. 12-15, the main process may be started and performed in the CPU 20 of the communication device 11 when the communication device 11 establishes a session with the communication device 12 to start an application for videoconference. The monitoring process may be started and performed during the main process. The main processing and the monitoring processing may be performed concurrently.

Figure 12:
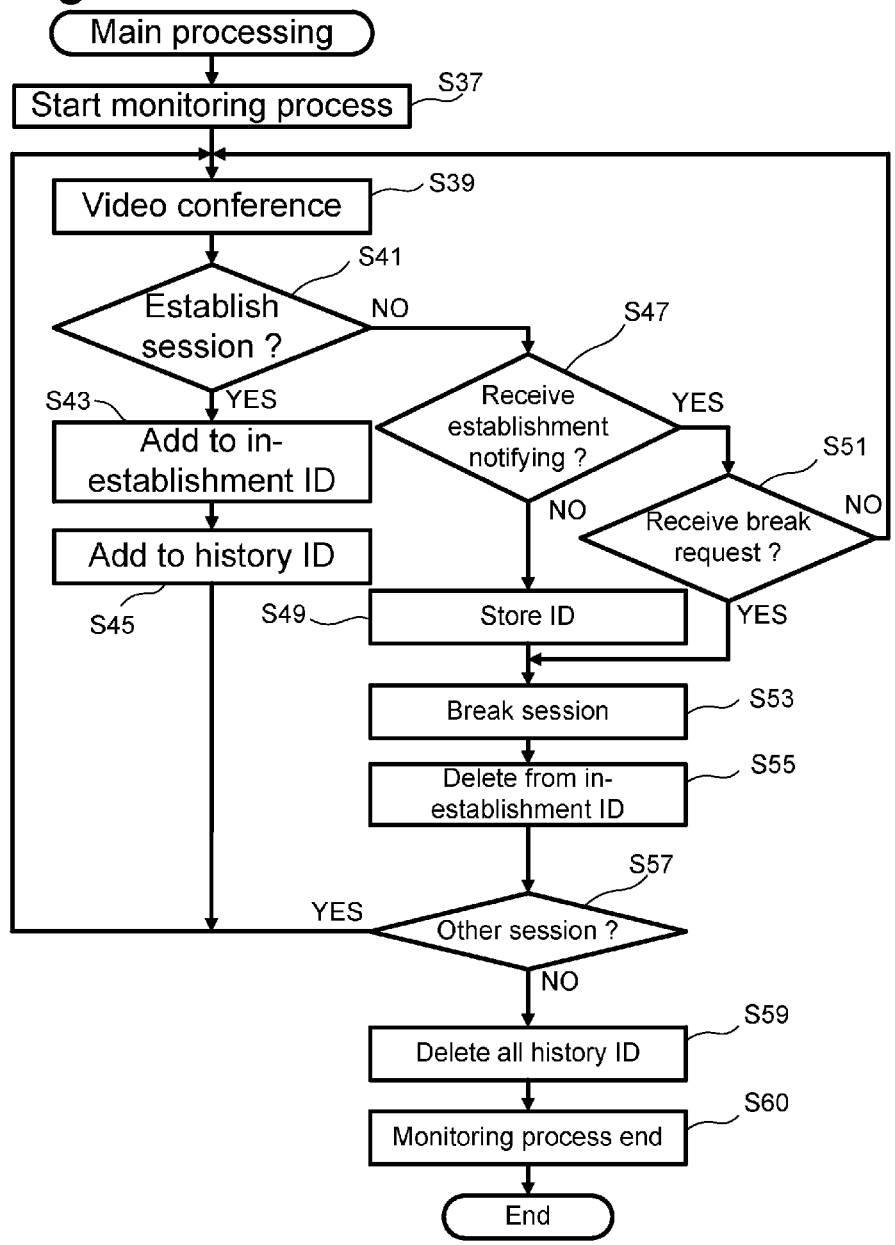
FIG. 12 is a flowchart of a main process according to an embodiment of the invention.
Figure 13:
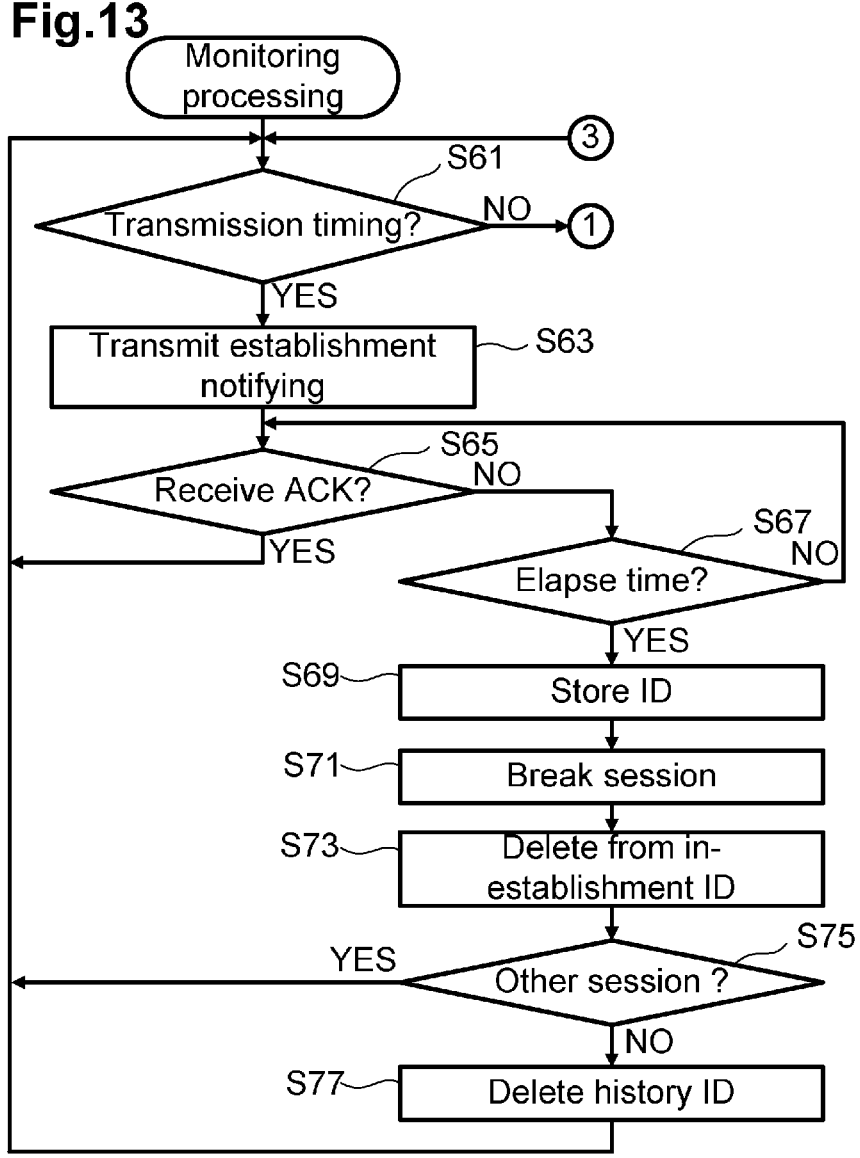
FIG. 13 is a flowchart of a monitoring process according to an embodiment of the invention.
Figure 14:
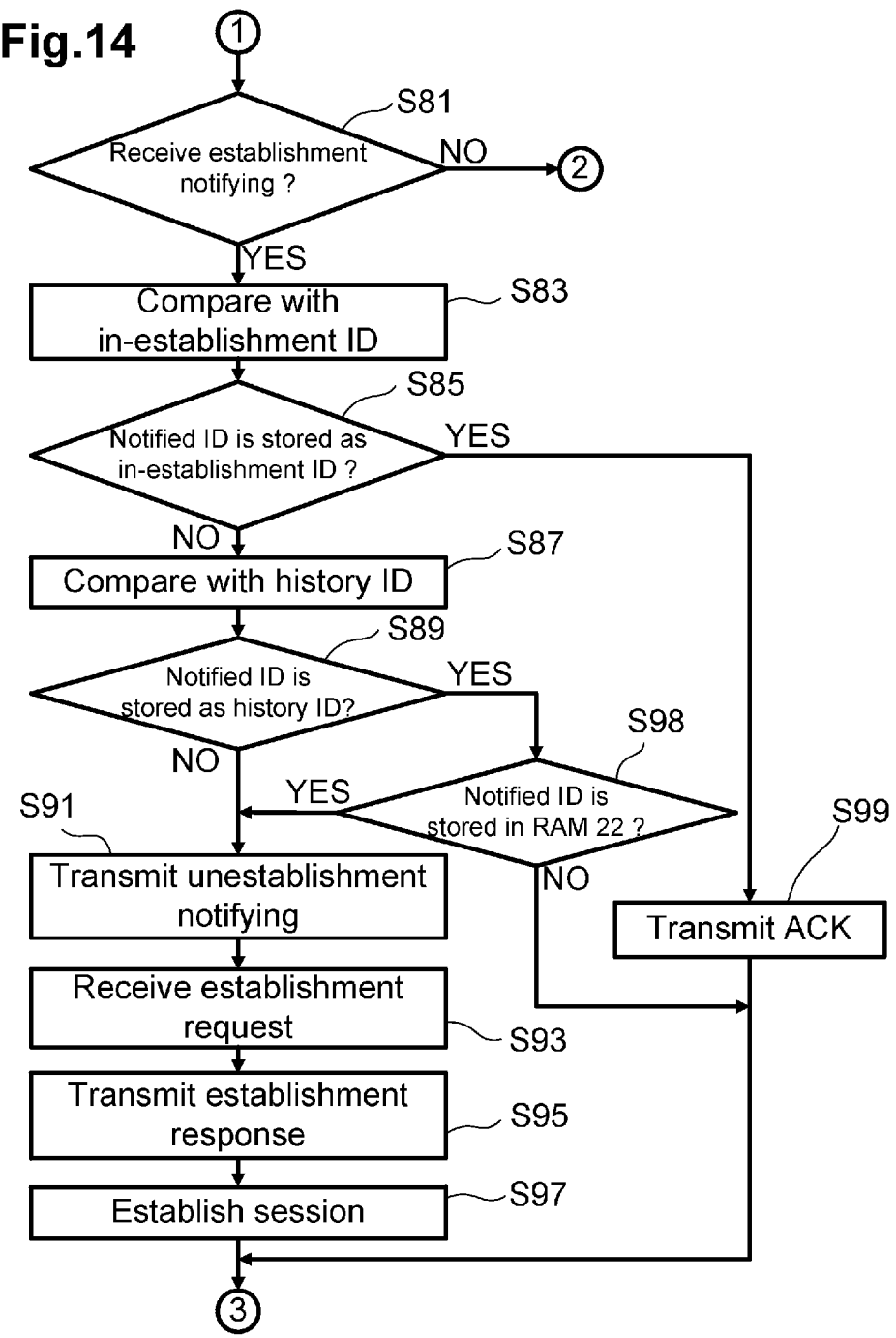
FIG. 14 is another flowchart of the monitoring process in FIG. 13.
Figure 15:
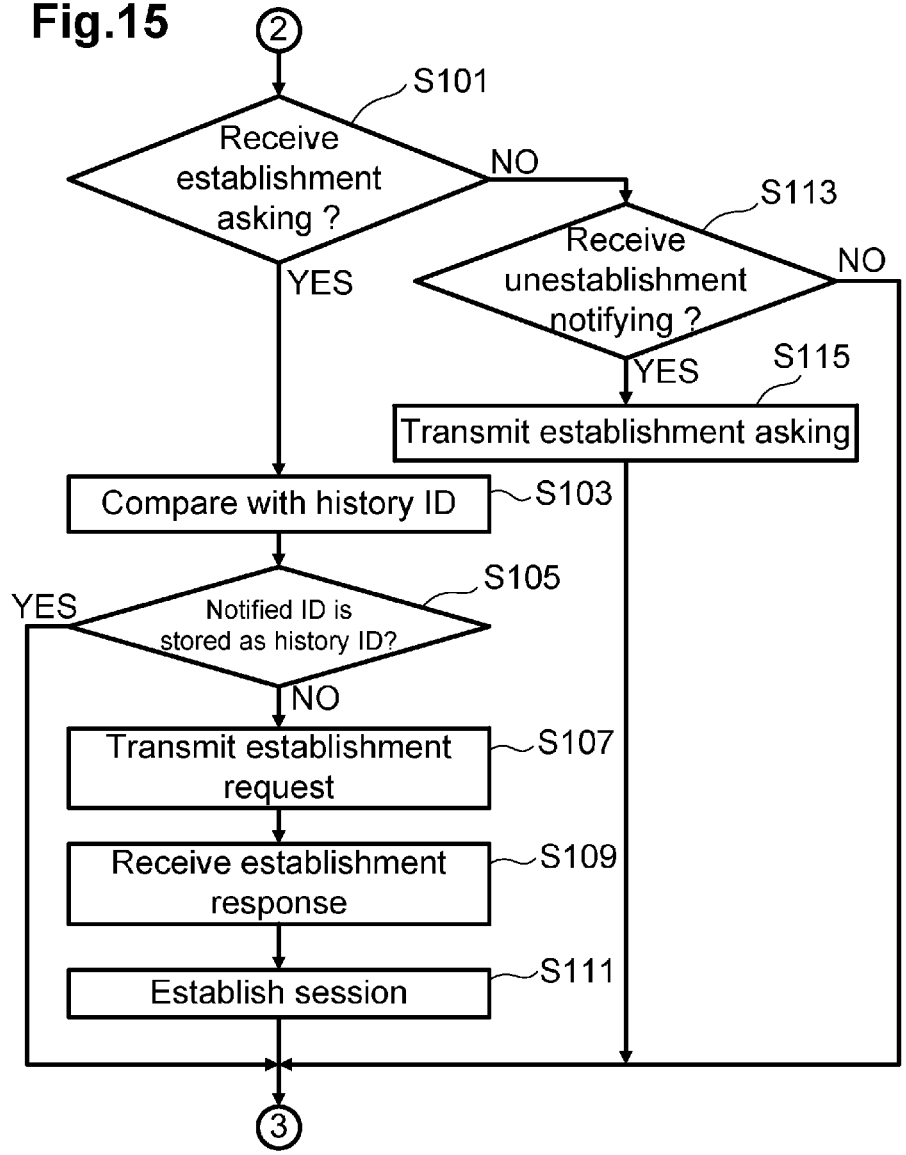
FIG. 15 is still another flowchart of the monitoring process in FIG. 13.

Referring to FIG. 12, in the main process, the ID of the communication device 12 having the established session may be stored as the in-establishment ID and the history ID in the table 31. At step S37, the monitoring processing may be performed, as shown in FIGS. 13-15. At step S39, the P2P-type communication may be performed with the communication device 12 having the established session, and the application for videoconference may be performed. It then may be determined whether another communication device 10 having a session established with the communication device 11 at step S97 in FIG. 14 or at step S111 in FIG. 15. When it is determined that there is another communication device 10 that has a session established with the communication device 11, e.g., YES at step S41, the ID of another communication device 10 that has the established session may be added to the in-establishment ID at step S43. At step S45, the ID of another communication device 10 having the established session may be added to the history ID. When the ID of another communication device 10 is already stored in the table 31, the ID may be updated by overwriting the already stored ID. The processing then may return to step S39.

When no other communication device 10 has a session established with the communication device 11, e.g., NO at step S41, it may be determined whether the establishment notifying is received at step S47. Specifically, the reception interval of the establishment notifying packet periodically transmitted from the communication device 12 having the session established with the communication device 11 may be specified. It then may be determined, for each of the other communication devices 10 that has the sessions established with the communication device 10, whether the establishment notifying packet has not been received over at least a predetermined time period at step S47. When no establishment notification packet has been received over at least the predetermined time period, e.g., NO in step S47, the condition of the communication with the other communication device 10 may be deteriorated. In this case, at step S49, the ID of the other communication device 10 may be stored in the RAM 22, such that if the session with the other communication device 10 is disconnected, the session may be reestablished after the communication condition improves at step S98 in FIG. 14. The process may then proceed to step S53.

On the other hand, when the establishment notification packet is received from each of the other communication devices 10 that have the established sessions within the predetermined time period, e.g., YES in step S47, it may be determined whether the break request packet is received from the other communication device 10 at step S51. When the break request packet is received from the other communication device 10, e.g., YES in step S51, step S53 may be performed. When the determination at step S51 results in YES, the other communication device 10 which transmitted the break request packet, may attempt to disconnect the session intentionally. Thus, the process may proceed to step S53 in order to disconnect the session with the other communication device 10. In this case, the ID of the communication device 10 may not be stored in the RAM 22, such that the session may not be reestablished at step S98 in FIG. 14. On the other hand, when the break request packet is not received, e.g., NO in step S51, the process may return to step S39.

The session may be disconnected at step S53. Specifically, at step S53, the session may be disconnected with the other communication device 10 for which it is determined at step S47 that the establishment notifying packet has not been received over at least the predetermined time period. In addition, at step S53, the session may also be disconnected with the other communication device 10 which transmitted the break request packet received at step S51. The communication for breaking the session may be performed at step S53. At step S55, the ID of the other communication device 10 with which the session is disconnected may be deleted from the in-establishment IDs. At step S57, it may be determined whether there is another communication device 10 that has a session established with the communication device 10. Whether there is another communication device 10 that has the established session with the communication device 11 may be determined on the basis of whether one or more in-establishment IDs are stored in the table 31. When one or more in-establishment IDs are stored in the table 31, there may be another communication device 10 that has the established session with the communication device 10. When there is another communication device 10 the established session, e.g., YES in S57, the process may return to step S39.

On the other hand, when no in-establishment ID is stored in the table 31, e.g., NO in step S57, there may be no other communication device 10 that has an established session with the communication device 10. In this case, all of the history IDs may be deleted, e.g., initialized, at step S59. Because the above-mentioned process may avoid prohibition of, e.g., permit the establishment communication as step S89 in FIG. 14, the establishment communication may be reliably performed in establishing a new session with another communication device 10. Thus, the communication device 11 may readily establish a session with another communication device 10 to start communication. Then, the monitoring process started at step S37 in FIGS. 13-15 may end at step S60. The main process may end.

Referring to FIGS. 13-15 depicting a monitoring process. The transmission period of the establishment notifying packet may be monitored and it may be determined whether the transmission time of the establishment notifying packet has come at step S61. When the transmission time of the establishment notifying packet has come, e.g., YES in step S61, another communication device 10, with which the communication device 10 establishes a session may be identified on the basis of the in-establishments ID stored in the table 31. The establishment notifying packet may be transmitted from the communication device 11 to the communication device 12 which establishes a session with the communication device 11 at step S63. Among the in-establishment IDs, the IDs other than the ID of the communication device 12 as the destination of the establishment notifying packet may be notified by the establishment notifying packet.

In response to the establishment notifying packet transmitted at step S63, the reception of ACK transmitted back from the communication device 12 may be monitored at step S65. When the ACK is received, e.g., YES in step S65, the communication condition of the communication channel with the communication device 12 may be determined as favorable, and the session may be maintained. The process then may return to step S61.

When the ACK is not received in response to the establishment notifying packet, e.g., NO in S65, the elapsed time may be monitored at step S67. The monitored elapsed time may be a time period elapsed from the transmission of the establishment notifying packet at step S63. When the elapsed time is less than a predetermined time period, e.g., NO in step S67, the process may return to step S65. When the elapsed time is equal to or greater than the predetermined time period, e.g., YES in S67, it may be determined that the condition of the communication with the communication device 12 is deteriorated. In this case, the ID of the communication device 12 may be stored in the RAM at step S69, such that if the session with the communication device 12 is disconnected, the session may be reestablished after the communication condition improves at step S98 in FIG. 14.

The session then may be disconnected at step S71. Specifically, the communication for breaking the session between the communication device 11 and the communication device 12, which has not received the ACK may be performed. The ID of the communication device 12, the session of which is disconnected, may be deleted from the in-establishment IDs at step S73. It may be determined whether there is another communication device 10 that has an established session at step S75. When one or more in-establishment IDs are stored, there may be another communication device 10 that has an established session. When there is another communication device 10 that has an established session, e.g., YES in step S75, the process may return to step S61. On the other hand, when no in-establishment ID is stored, e.g., NO at step S75, there may be no other communication device 10 that has an established session. In this case, all of the history IDs may be deleted at step S77. Because the above-mentioned process may avoid prohibition of the establishment communication at step S89 in FIG. 14, the establishment communication may be reliably performed in establishing a new session with another communication device 10. Thus, the communication device 11 may readily establish a session with another communication device 10 to start communication. The process may return to step S61.

On the other hand, when it is determined that the transmission time of the establishment notifying packet has not come, e.g., NO in step S61, it may be determined whether the establishment notification packet is received from another communication device 10 that has an established session at step S81, as shown in FIG. 14. When the establishment notifying packet is received, e.g., YES in step S81, the ID notified in the establishment notifying packet may be identified. The notified ID may be compared with the in-establishment IDs at step S83. When the notified ID is already stored as the in-establishment ID, e.g., YES in step S85, the session with the communication device 10 indicated by the notified ID may be already established. In this case, the establishment communication may not be performed with the communication device 10 indicated by the notified ID. ACK may be transmitted back to the other communication device 10 which transmitted the establishment notifying packet by the communication device 10 at step S99. The process then may return to step S61 in FIG. 13.

On the other hand, when the notified ID by the establishment notification packet is not stored as the in-establishment ID, e.g., NO in step S85, a session between the communication device 11 and the communication device 12 indicated by the notified ID may not be established. In this case, the notified ID may be compared with the history IDs at step S87. When the notified ID is not stored as the history ID, e.g., NO in step S89, the process may proceed to step S91. When the determination at step S89 results is "NO," the establishment of the session with the communication device 12 may be permitted.

When the notified ID is stored as the history ID, e.g., YES in step S89, at step S98, the notified ID may be compared with the ID, which is stored in the RAM 22 at step S49 in FIG. 12 or at step S69 in FIG. 13. When the notified ID matches the ID stored in the RAM 22, e.g., YES in step S98, step S91 may be performed. When the determination at step S98 results in "YES," the establishment of the session with the other communication device 10 may be permitted. The processing may proceed to step S91 in order to perform the establishment communication, e.g., permit establishment of communication, with the communication device 12 indicated by the notified ID. On the other hand, when the notified ID does not match the ID stored in the RAM 22, e.g., NO in step S98, the establishment of the session with the communication device 12 identified by the notified ID may be prohibited. In this case, the establishment communication may not be performed and the processing may return to step S61 in FIG. 13.

At steps S91, S93, S95, and S97, the establishment communication may be performed in the following manner. The establishment communication performed at steps S91, S93, S95, and S97 may be a communication for establishing the session with the communication device 12 identified by the ID in the establishment notifying packet. The CPU 20 of the communication device 11 in FIG. 11 may perform each processes at steps S91, S93, S95, and S97.

The unestablishment notifying packet may be transmitted to the communication device 12 which transmits the establishment notifying packet at steps S91 and S19 in FIG. 11. The ID of the communication device 13, which does not establish a session with the communication device 11, may be notified to the communication device 12 by the unestablishment notifying packet. In response to reception of the unestablishment notifying packet, the communication device 12 may transmit the establishment asking packet to the communication device 13 identified by the notified ID at step S115 in FIG. 15 and step S21 in FIG. 11. The ID of the communication device 11, with which the session is to be established, may be notified in the establishment asking packet. In response to reception of the establishment asking packet, the communication device 13 may transmit the establishment request packet to the communication device 11 identified by the notified ID at step S107 in FIG. 15 and step S23 in FIG. 11. The establishment request packet may be received at step S93. The establishment response packet may be transmitted in response to the received establishment request packet at steps S95 and S25 in FIG. 11. Thus, at step S97, the session may be established with the other communication device 10 indicated by the ID notified in the establishment notifying packet received at step S81. The process may return to step S61 in FIG. 13.

On the other hand, when establishment notifying packet is not received, e.g., NO in step S81, it may be determined whether the establishment asking packet is received from another communication device 10 at step S101, as shown in FIG. 15. When the establishment asking packet is received from another communication device 10, e.g., YES in step S101, the ID notified in the establishment asking packet may be identified. The establishment communication for establishing a session between the communication device 10 and the other communication device 10 identified by the notified ID may be performed in steps S103, S105, S107, S109, and S111. The CPU 20 of the communication device 13 in FIG. 11 may perform the processes at steps S103, S105, S107, S109, and S111.

The ID 11 notified in the establishment asking packet at step S21 in FIG. 11 receiving from the communication device 12 may be compared with the history ID at step S103. When the notified ID is already stored as the history ID, e.g., YES in step S105, the establishment of a session with the communication device 11 identified by the notified ID may be prohibited. Thus, the process may return to step S61 in FIG. 13.

On the other hand, when the notified ID 11 is not stored as the history ID, e.g., NO in step S105, the establishment of the session with the communication device 11 may be permitted. Thus, the establishment communication may be performed with the communication device 11 in order to establish the session with the communication device 11. The establishment request packet may be transmitted to the communication device 11 identified by the notified ID at step S107 and step S23 in FIG. 11. The establishment response packet at step S95 in FIG. 14 transmitted back from the communication device 11, which received the establishment request packet, may be received at step S109 and step S25 in FIG. 11. At step S111, the session may be established with the communication device 10 indicated by the ID included in the establishment asking packet received at step S101. The processing may return to step S61 in FIG. 13.

At step S101, when establishment asking packet is not received, e.g., NO in step S101, it may be determined whether the unestablishment notifying packet is received from another communication device 10 at step S113. When the unestablishment notifying packet is received from another communication device 10, e.g., YES in step S113, the ID notified in the unestablishment notifying packet may be specified. The establishment asking packet may be transmitted to the communication device 10 identified by the notified ID at step S115. The ID of the other communication device 10, with which the session is to be established, may be notified in the establishment asking packet. The CPU 20 of the communication device 12 in FIG. 11 may perform each processing at steps S113 and S115 and steps S19 and S21 in FIG. 11.

As described above, the communication device 10 may monitor the session state based on the ID notified by another communication device 10 in the establishment notifying packet. The communication device 10 may have a function of automatically reestablishing the disconnected session. When the notified ID is not stored as the in-establishment ID or as the history ID in the table 31, the communication device 10 may establish the session with the other communication device 10 indicated by the notified ID. On the other hand, when the notified ID is stored as the history ID, the communication device 10 may determine that the session with the other communication device 10 indicated by the notified ID may be intentionally disconnected. The communication for establishing the session may be prohibited. The above-mentioned process may prevent the reestablishment of the intentionally disconnected session. The communication device 10 may successfully connect or disconnect the desired session.

The communication device 10 may distinguish the intentionally disconnected session from the session disconnected when the communication through the establishment notifying packet fails. Specifically, the communication device 10 may make the distinction between the intentionally disconnected session and the session broken when the communication through the establishment notifying packet fails based on whether the ID of the communication device 10 is stored in the RAM 22. The above-mentioned process may reliably prevent the reestablishment of the intentionally disconnected session in the communication device 10.

Figure 16:
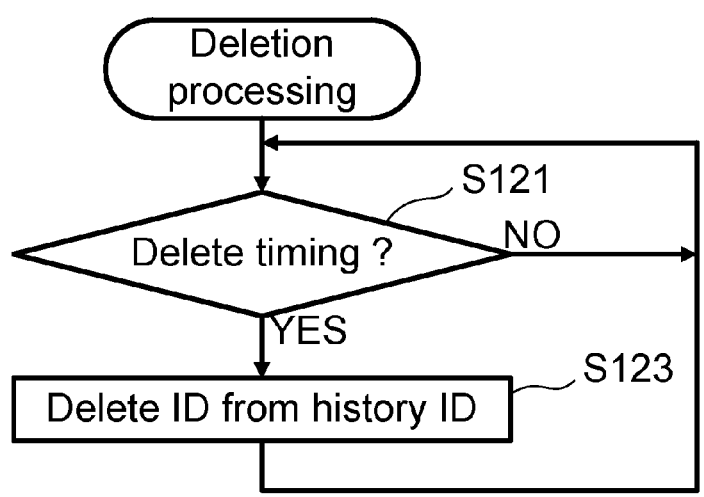
FIG. 16 is a flowchart of a deleting process according to an embodiment of the invention.

The ID may be added as the history ID when the session is established. In this case, the added ID may not be deleted from the history ID until all of the sessions are disconnected at step S59 in FIG. 12 and step S77 FIG. 13 in this embodiment. However, in another embodiment, the history ID may be deleted on the basis of an elapsed time from the addition of the ID to the history ID. FIG. 16 depicts the deletion process performed in the CPU 20. The deletion process may start and performed when the power of the CPU 20 is turned on. The deletion process may be performed concurrently with the main process and the monitoring process. In the deletion process, the elapsed time from the addition of the ID to the history ID may be monitored for each ID. It may be determined whether the elapsed time from the addition of the ID to the history ID reaches a predetermined value at step S121. When the elapsed time is less than the predetermined value, e.g., NO in step S121, the process may return to step S121. When the elapsed time is equal to or greater than the predetermined value, e.g., YES in S121, the ID for which the elapsed time is equal to or greater than the predetermined value may be deleted from the history ID at step S123. The process then may return to step S121.

With these steps, when another communication device 10, which previously disconnected from the session, requests the reestablishment of a session after the elapse of the predetermined time, the communication device 10 may establish the session with the other communication device 10.

Whether the deletion time has come may be determined on the basis of the elapsed time from the history ID is first stored. The ID stored in the RAM may also be deleted by executing same process of FIG. 16.

The communication device 10 may manage the single table 31 with the in-establishment ID and the history ID stored therein. A group of establishment ID and the history ID may be generated for each videoconference. The group may comprise a plurality of the communication device 10 which take part in the videoconference. If a plurality of the video conference is held, a plurality of the groups may be generated. A communication device 10 may belong to a plurality of the groups. In this case, the table 31 may be provided for each of the groups, and each table 31 may be stored in the HDD 23. The communication device 10 may manage the connection for a session for each group. Consequently, when the communication device 10 belongs to such plural groups, the communication device 10 may prevent the reestablishment of a session within one group from being established in another group.

The establishment communication may be performed by using the unestablishment notifying packet, the establishment asking packet, the establishment request packet, and the establishment response packet, as shown in FIG. 11. For example, in FIG. 11, the communication device 11 may transmit the establishment request packet directly to the communication device 13. In response to reception of the establishment request packet from the communication device 11, the communication device 13 may transmit the establishment response packet to the communication device 11. Thus, the number of packets transmitted to establish a session may be reduced. The establishment communication may be performed immediately to establish the session.

The establishment communication and the communication for breaking the session described above may be performed between the plurality of communication devices 10 or may be performed via a server or the like.

While the invention has been described in connection with various exemplary structures and illustrative embodiments, it will be understood by those skilled in the art that other variations and modifications of the structures, configurations, and embodiments described above may be made without departing from the scope of the invention. For example, this application may comprise many possible combinations of the various elements and features disclosed herein, and the particular elements and features presented in the claims and disclosed above may be combined with each other in other ways within the scope of the application, such that the application should be recognized as also directed to other embodiments comprising any other possible combinations. Other structures, configurations, and embodiments will be apparent to those skilled in the art from a consideration of the specification or practice of the invention disclosed herein. It is intended that the specification and the described examples are illustrative with the true scope of the invention being defined by the following claims.

What is claimed is:

1. A communication device comprising:
    a memory comprising:
        a first storage area configured to store an in-establishment identifier of at least one external communication device, which is in a communication session with the communication device, and
        a second storage area configured to store a history identifier of the at least one external device, which previously established a communication session with the communication device;
    a controller configured to control the communication device to execute steps of:
        transmitting the in-establishment identifier stored in the first storage area to a first external communication device of the at least one external communication device, which is in the communication session with the communication device;
        receiving a first device identifier from the first external communication device in response to the transmission of the in-establishment identifier;
        determining whether the first device identifier received from the first communication device is already stored as the history identifier in the second storage area of the memory of the communication device;
        restricting re-establishment of the communication session with the first external communication device when the first device identifier, received from the first external communication device, is not stored as the in-establishment identifier in the first storage area of the memory of the communication device and is stored as the history identifier in the second storage area of the memory of the communication device after a break in the communication session between the communication device and the first external communication device.

2. The communication device according to claim 1, wherein the controller is further configured to control the communication device to execute steps of:
    receiving establishment notifying data from the first external communication device which is in the communication session with the communication;
    determining whether the establishment notifying data from the first external communication device is received;
    storing the first device identifier of the first external communication device in a third storage area of the memory of the communication device when the establishment notifying data from the first external communication device is not received; and
    deleting the first device identifier of the first communication device as the in-establishment identifier from the first storage area when the establishment notifying data from the first external communication device is not received.

3. The communication device according to claim 2,
    wherein the establishment notifying data from the first external communication device is received repeatedly at a predetermined time interval, and
    wherein the communication device determines that the establishment notifying data from the first external communication device is received when the establishment notifying data is received at each predetermined time interval.

4. The communication device according to claim 2, wherein the controller is further configured to control the communication device to execute steps of:
    determining whether the first device identifier of the first external communication device is stored in the third storage area after the break in the communication session;
    permitting re-establishment of the communication session between the communication device and the first communication device when the first device identifier of the first external communication device is stored in the third storage area;
    restricting the re-establishment of the communication session between the communication device and the first external communication device when the first device identifier is not stored in the third storage area.

5. The communication device according to claim 1, wherein the communication device is configured to connect to a group of a plurality of external communication devices in a particular communication session and the communication device designates the first storage area and the second storage area in the memory for the particular communication session.

6. The communication device according to claim 5, wherein the communication device is further configured to connect to a plurality of groups of external communication devices, wherein each group of external communication devices belongs in a communication session and the communication device designates a portion of the first storage area and a portion of the second storage area for each communication session.

7. The communication device according to the claim 1, wherein the controller is further configured to control the communication device to execute steps of:
permitting re-establishment of the communication session between the communication device and the first external communication device when the first device the first external communication device is not stored in the second storage area as the history identifier after the break in the communication session between the communication device and the first external communication device.

8. The communication device according to the claim 1, wherein the controller is further configured to control the communication device to execute steps of:
permitting re-establishment of the communication session between the communication device and the first external communication device when the first device identifier received from the first external communication device is not stored in the first storage area as the in-establishment identifier and is not stored in the second storage area as the history identifier after the break in the communication session.

9. The communication device according to claim 1, wherein the communication session between the communication device and the first external communication device is implemented in a peer-to-peer communication and the first device identifier is received from the first external communication device via the peer-to-peer communication.

10. The communication device according to claim 1, wherein the controller is further configured to control the communication device to execute steps of:
deleting the first device identifier of the first external communication device as the in-establishment identifier from the first storage area when the communication device is disconnected from the first external communication device;
determining whether any other device identifier is stored as another in-establishment identifier in the first storage area;
initializing the second storage area when no other device identifier is stored in the first storage area another as in-establishment identifier.

11. The communication device according to claim 1, wherein the at least one external communication device comprises the first external communication device and a second external communication device,
wherein the controller is configured to control the communication device to receive a second device identifier of the second external communication device,
wherein the first storage area is configured to store each of the first device identifier and the second device identifier as a plurality of in-establishment identifiers of the first and second external devices, which are each in a communication session with the communication device, and
wherein a second storage area configured to store each of the first device identifier and the second device identifier as a plurality of a history identifiers of the first and second external devices, each of which previously established a communication session with the communication device,
wherein the controller is further configured to delete one of the first device identifier and the second device identifier as one of the plurality of in-establishment identifiers when the communication session with the communication device is disconnected from the respective first external communication device and second external communication device.

12. A method for implementing a communication session at a communication device, the method comprising the steps of:
storing an identifier of at least one external communication device as an in-establishment identifier, which is in the communication session with the communication device, in a first storage area of a memory of the communication device;
storing the identifier of the at least one external communication device as a history identifier, which previously established a communication session with the communication device, in a second storage area of the memory of the communication device;
transmitting the in-establishment identifier stored in the first storage area to a first external communication device of the at least one external communication device, which is in the communication session with the communication device;
receiving a first device identifier from the first external communication device in response to transmitting the identifier;
determining whether the first external device identifier received from the first external communication device is stored as the history identifier in the second storage area of the memory of the communication device;
restricting re-establishment of the communication session with the first external communication device when the first device identifier, received from the first external communication device, is not stored in the first storage area of the memory of the communication device as the in-establishment identifier and is stored in the second storage area of the memory of the communication device as the history identifier after a break in the communication session between the communication device and the first external communication device.

13. A non-transitory computer readable storage medium storing computer readable instructions that, when executed, cause a communication device to execute the steps of:
storing an identifier of at least one external communication device as an in-establishment identifier, which is in the communication session with the communication device, in a first storage area of a memory of the communication device;
storing the identifier of the at least one external communication device as a history identifier, which previously established a communication session with the communication device, in a second storage area of the memory of the communication device;
transmitting the in-establishment identifier stored in the first storage area to a first external communication device of the at least one external communication device, which is in the communication session with the communication device;
receiving a first device identifier from the first external communication device in response to transmitting the identifier;
determining whether the first external device identifier received from the first communication device is stored as the history identifier in the second storage area of the memory of the communication device;
restricting re-establishment of the communication session with the first external communication device when the first device identifier, received from the first external communication device, is not stored in the first storage area of the memory of the communication device as the in-establishment identification and is stored in the second storage area of the memory of the communication device as the history identifier after a break in the communication session between the communication device and the first external communication device.

* * * * *